(12) United States Patent
Cao et al.

(10) Patent No.: US 8,769,653 B2
(45) Date of Patent: Jul. 1, 2014

(54) UNIFIED ACCESS CONTROL SYSTEM AND METHOD FOR COMPOSED SERVICES IN A DISTRIBUTED ENVIRONMENT

(75) Inventors: Bao Hua Cao, Beijing (CN); Jian Wang, Beijing (CN); Li Wang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 12/431,909

(22) Filed: Apr. 29, 2009

(65) Prior Publication Data

US 2009/0276840 A1 Nov. 5, 2009

(30) Foreign Application Priority Data

Apr. 30, 2008 (CN) .......................... 2008 1 0095970

(51) Int. Cl.
*G06F 7/04* (2006.01)
(52) U.S. Cl.
USPC ............................................................ 726/9
(58) Field of Classification Search
USPC ....................................................... 726/4–10
See application file for complete search history.

(56) References Cited

U.S. PATENT DOCUMENTS

| | | | |
|---|---|---|---|
| 7,434,252 B2 | 10/2008 | Ballinger et al. | |
| 7,454,786 B2* | 11/2008 | Chang et al. | 726/14 |
| 8,065,712 B1* | 11/2011 | Cheng et al. | 726/1 |
| 2001/0027527 A1* | 10/2001 | Khidekel et al. | 713/201 |
| 2002/0169876 A1* | 11/2002 | Curie et al. | 709/226 |
| 2002/0184521 A1* | 12/2002 | Lucovsky et al. | 713/200 |
| 2003/0229812 A1 | 12/2003 | Buchholz | |
| 2005/0138362 A1* | 6/2005 | Kelly et al. | 713/156 |
| 2005/0138412 A1* | 6/2005 | Griffin et al. | 713/200 |
| 2005/0229236 A1* | 10/2005 | Devgan et al. | 726/1 |
| 2007/0198522 A1 | 8/2007 | Britton et al. | |
| 2007/0208741 A1 | 9/2007 | Vishwanath et al. | |
| 2008/0010665 A1* | 1/2008 | Hinton et al. | 726/1 |
| 2008/0244687 A1* | 10/2008 | McClain et al. | 726/1 |
| 2008/0256357 A1* | 10/2008 | Iyengar et al. | 713/155 |

FOREIGN PATENT DOCUMENTS

| | | |
|---|---|---|
| CN | 1633085 A | 6/2005 |
| WO | WO 2007090866 A1 | 8/2007 |

OTHER PUBLICATIONS

Joon S. Park et al, Role-Based Access Control on the Web, ACM Transactions on Information and System Security, vol. 4, No. 1, Feb. 2001, pp. 37-71.

* cited by examiner

*Primary Examiner* — Brandon Hoffman
(74) *Attorney, Agent, or Firm* — Thomas Grzesik; Fleit Gibbons Gutman Bongini & Bianco PL (57) ABSTRACT

A system, a computer device implemented method, and a computer readable article of manufacture for executing a computer implemented method for a unified access control for a plurality of composed services in a distributed computing environment without requiring repeated input of security certification. The method includes the steps of: acquiring a first role of a user in a first composed service; sending an invoking request by a processing unit of the first composed service to a second composed service; receiving the first role of the user in the first composed service and predefined role-role mapping relationships, and determining a second role of the user in the second composed service by a role determining component; and then sending the determined role in the second composed service by a role sending component to the second composed service, thereby providing unified access without requiring repeated input of security certification.

20 Claims, 7 Drawing Sheets

| Role-role mapping list | | | |
|---|---|---|---|
| Role in source service | Role in target service | Constraint (optional) | Priority (optional) |
| DMS. ordinary user | DMS. ordinary user | 24x7 | 1 |
| DMS. programmer | DCM. cashier | 24x7 | 1 |
| DMS. administrator | DCM. administrator | 24x7 | 1 |
| DMS. programmer | DCM. ordinary user | Monday | 2 |

| Role-role mapping list | | | |
|---|---|---|---|
| Role in source service | Role in target service | Constraint (optional) | Priority (optional) |
| DMS. ordinary user | DMS. ordinary user | 24x7 | 1 |
| DMS. programmer | DCM. cashier | 24x7 | 1 |
| DMS. administrator | DCM. administrator | 24x7 | 1 |
| DMS. programmer | DCM. ordinary user | Monday | 2 |

UNIFIED ACCESS CONTROL SYSTEM AND METHOD FOR COMPOSED SERVICES IN A DISTRIBUTED ENVIRONMENT

CROSS-REFERENCE TO RELATED APPLICATION

This application claims priority under 35 U.S.C. §119 from Chinese Patent Application No. 200810095970.9 filed on Apr. 30, 2008, the entire contents of which are incorporated herein by reference.

BACKGROUND OF THE INVENTION

1. Field of the Invention

The present invention relates to security federation of a plurality of composed services in a distributed computing environment, and particularly, to a system and method for performing a unified access control for a plurality of composed services in a distributed computing environment through combining centralized and distributed computing.

2. Description of Related Art

With the rapid growth of service oriented architecture, SOA, and Web services, more and more applications are composed of distributed Web services hosted by different organizations and enterprises. A user usually has different rights and privileges for different services. At the time of the running of an application, when the user requests access to one or more functions of a certain service, the user is not permitted to have access unless the user has a role permitting access to the function requested.

Therefore, for applications composed of distributed Web services hosted by different organizations and enterprises, when the user accesses a certain composed service to invoke a function there, and the function needs to request information from other composed services to fulfill a complete service, it is necessary to re-perform a security verification for the user with respect to each of the composed services. By way of example, the user needs to access a network composed service A to invoke a function there, and passes the security verification at the service A. Since the function in the service A, when executed, needs to invoke a function operation in another composed service B to fulfill a complete service, and the service B is owned by another enterprise and has its own security verification information, the service B requests performing the security verification on the user again. Such repetitious verifications are time consuming and inefficient. It is very inconvenient and troublesome for the user to input security information including his username, password and role again.

Network service security federation is proposed with respect to this problem so as to provide a unified security management for a plurality of composed services. By means of the network service security federation, the security certification information can be brought to the service B when the service A invokes the service B, so that the service B can verify the user directly without requiring the user to input the security certification information again. Therefore, invoking the service B by the service A is transparent to the user.

The verification of the security federation can be divided into three levels, i.e., identification, authentication, and authorization. The identification verifies that a user who requests to access a service is actually the user whom it claims to be through a user identifier (ID) and a login password; the authentication decides what role the user who passes the identification has in the service; and the authorization decides what operation rights, e.g., read-only, editing or the like, the user having a certain role with respect to resources to which the execution of a requested function is related.

Figure 1:
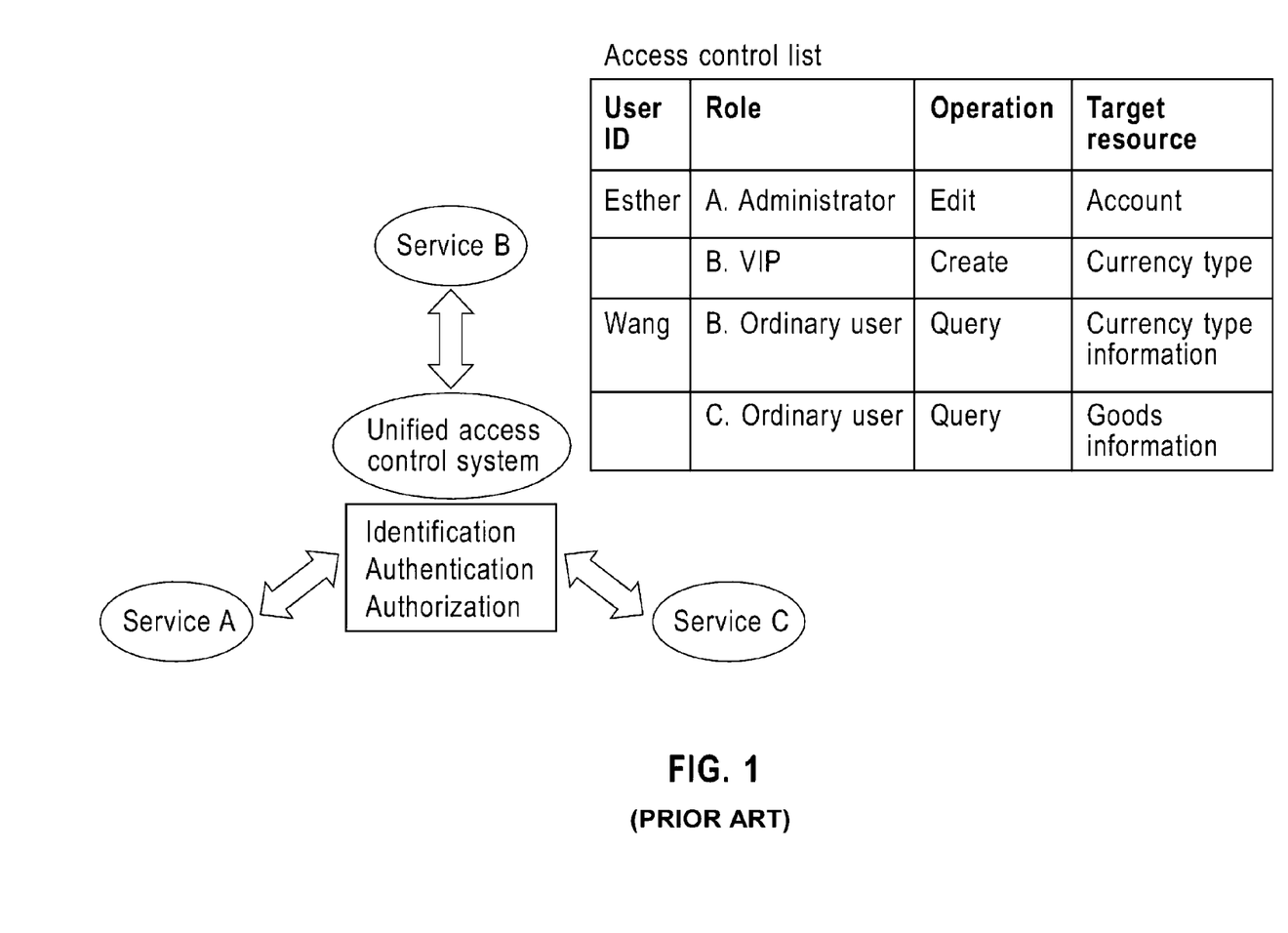
FIG. 1 is a system architecture diagram for realizing a network service security federation in a convention method.

To realize the network service security federation, a conventional method is to adopt a centralized management architecture as shown in FIG. 1. In this solution, a unified access control system is utilized to provide identification, authentication, and authorization for a plurality of composed services.

As shown in FIG. 1, an administrator of the unified access control system creates an access control list, ACL. Included in this list, for each user of composed services are: roles in all of the composed services, what operations the roles can perform, and to what resources the operations will relate. These parameters are recorded. In this way, when a user intends to access a certain service to request one or more functions in the service, the system matches roles of the user according to the access control list, and further determines whether the user has a right to perform the requested functions.

For example, as shown in FIG. 1, when a user Esther accesses a service A to request to edit accounts, the system determines that her role in the service A is administrator and that she can perform the requested editing operation according to the ACL. The action of the account editing operation in the service A needs to invoke a currency type creating operation in a service B. At this time, the system will automatically acquire data from the ACL that a role of the user Esther in the service B is VIP, and judge that the user has a right to perform the invoked creating operation. Subsequently, service B permits the user Esther to perform the operation and returns a result of the operation to service A.

However, in the above solution, because the system administrator has to record in the ACL roles that each user has, operations that the roles can perform, and resources that the operations relate to, the work load will be very heavy, particularly when there are many users. Moreover, the administrator must modify the ACL manually when a new composed service is added into the system, role information is changed, or a security policy is changed. Therefore, the burden of the system administrator is very large and the scalability of the solution is not good.

Another conventional method for realizing the network service security federation is by building security features, e.g., roles, into codes, which means that the security must be addressed directly through the codes by providing appropriate statements. This method requires changing the codes when access logics are changed, which proves to be more inconvenient.

Therefore, there is a need for a unified security access control system and method which can provide a flexible, dynamic, and light-weight security solution.

SUMMARY OF THE INVENTION

The invention provides a unified security access control for a series of composed services in a distributed environment.

According to an aspect of the invention, there is provided a computer device implemented method for a unified access control for a plurality of composed services in a distributed computing environment without requiring repeated input of security certification. The method includes the steps of: acquiring a first role of a user in a first composed service by a role acquiring component of a computing system device; sending an invoking request by a processing unit of the first composed service to a second composed service; receiving the first role of the user in the first composed service and predefined role-role mapping relationships by a role determining component in response to the invoking request of the first composed service to the second composed service; determining a second role of the user in the second composed service by the role determining component according to the first role of the user in the first composed service and the predefined role-role mapping relationships; and sending the determined role in the second composed service by a role sending component to the second composed service, thereby providing unified access without requiring repeated input of security certification.

According to another aspect of the invention, there is provided a unified access control computer device system for providing a unified access control for a plurality of composed services in a distributed computing environment without requiring repeated input of security certification. The system includes: a role acquiring component for acquiring a first role of a user in a first composed service; a processing unit of the first composed service for sending an invoking request to a second composed service; a role determining component for determining a second role of the user in a second composed service according to the first role of the user in the first composed service and predefined role-role mapping relationships, in response to an invoking request of the first composed service to the second composed service; and a role sending component for sending the determined second role in the second composed service to the second composed service, thereby providing unified access without requiring repeated input of security certification.

In yet another aspect of the invention there is provided computer readable article of manufacture tangibly embodying computer readable instructions for executing a computer device implemented method of providing a unified access control for a plurality of composed services in a distributed computing environment without requiring repeated input of security certification. The method includes the steps of: acquiring a first role of a user in a first composed service by a role acquiring component of a computing system device; sending an invoking request by a processing unit of the first composed service to a second composed service; receiving the first role of the user in the first composed service and predefined role-role mapping relationships by a role determining component in response to the invoking request of the first composed service to the second composed service; determining a second role of the user in the second composed service by the role determining component according to the first role of the user in the first composed service and the predefined role-role mapping relationships; and sending the determined role in the second composed service by a role sending component to the second composed service, thereby providing unified access without requiring repeated input of security certification.

The unified access control system, method, and article of manufacture described above provide a light-weight and independent service security federation solution that has good manageability, scalability, and security, providing unified access without requiring repeated input of security certification.

BRIEF DESCRIPTION OF THE DRAWINGS

These and other aspects, features, and advantages of the invention will become more apparent and understood from the following description of embodiments in conjunction with the accompanying drawings.

DETAILED DESCRIPTION OF THE PREFERRED EMBODIMENTS

A detailed description will be made below with reference to exemplary embodiments of the invention. Examples of the embodiments are illustrated in the accompanying drawings, wherein like reference numerals refer to like elements throughout. However, the invention can be embodied in many different forms, and should not be construed to be limited to the embodiments set forth here. The exemplary embodiments are described below with reference to the figures to explain the invention.

The idea of the invention lies in implementing network service security federation by combining centralized and distributed computing, and replacing the access control list ACL of the prior art with a role-role mapping list, so as to mitigate the work load of the system administrator and result in a system that has good scalability.

A key point of the invention lies in establishing the role-role mapping relationships to describe the mapping relationships among the roles contained in the plurality of composed services. By applying the role-role mapping relationships, each time an application changes security policy, this change will be automatically applied to all composed services of the application. Thus, it possesses good manageability. Specifically, the administrator only needs to insert a role mapping relationship record, instead of inserting a large number of user records and user role information. If a role in a source service is changed, a change is automatically performed in a destination service.

Furthermore, the role-role mapping relationships of the invention provide more capabilities for use. More authorization capabilities can be obtained by adding a property, such as a constraint, a priority and the like, to each mapping. In addition, because the identification and the authentication are carried out at a centralized point in the invention, all security information can be centralized at the central control point, thereby avoiding any unintentional change or mistake, and thus enhancing security. Additionally, the invention has good scalability because the security policy can be managed by an entrusted service administrator. Finally, the unified access control system and method according to the invention provides a light-weight and independent service security federation solution in which a security administrator does not need to communicate with developers to modify codes, but can simply modify a rule mapping policy.

Figure 2:
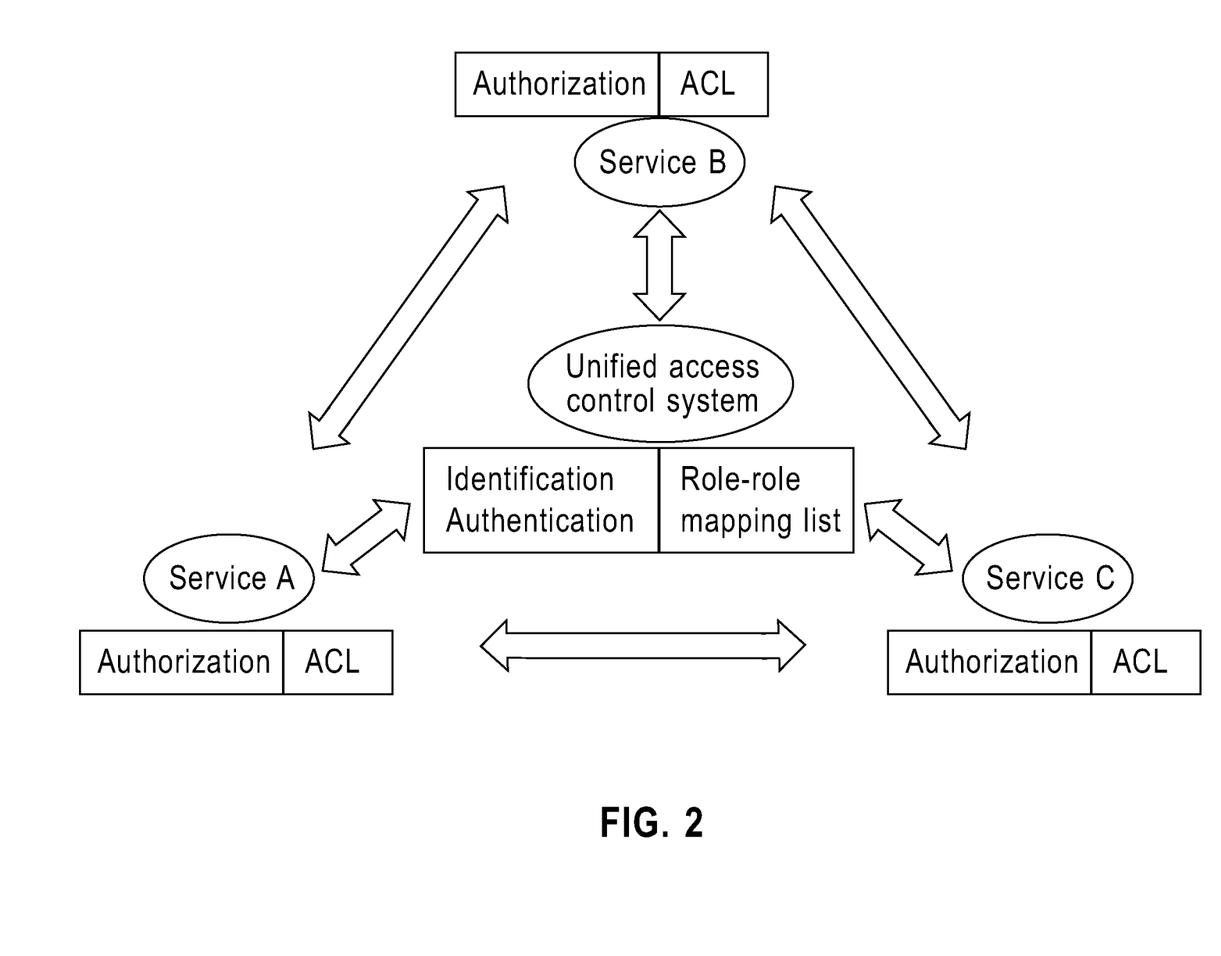
FIG. 2 shows an architecture diagram for realizing a network service security federation by combining centralized and distributed computing according to an embodiment of the invention.

FIG. 2 shows a structural diagram for implementing network service security federation by combining centralized and distributed computing according to an embodiment of the invention. Considering that a third level in the security federation verification, i.e., the authorization is often more closely related to particular services, as shown in FIG. 2, the unified access control system provides unified identification and authentication for composed services, and authorization is performed in the composed services A through C in this embodiment of the invention. This architecture makes the security verification process clear and thus has a higher overall efficiency. As shown in FIG. 2, a role-role mapping list is employed in the unified access control system of the present invention to replace the access control list ACL used in the prior art. Therefore, as compared with the prior art, the work load of the system administrator is mitigated and the system is made to have good scalability.

What is shown in FIG. 2 is only a preferred exemplary architecture. The invention can also be implemented by using other architectures. For example, although the identification is described above to be performed by centralized computing by the unified access control system, it can be performed in respective composed services A through C where the unified access control system is notified of the result of the identification according to specific requirements of applications and users. The role-role mapping list is first described below in conjunction with FIGS. 3 and 4.

Figure 3:
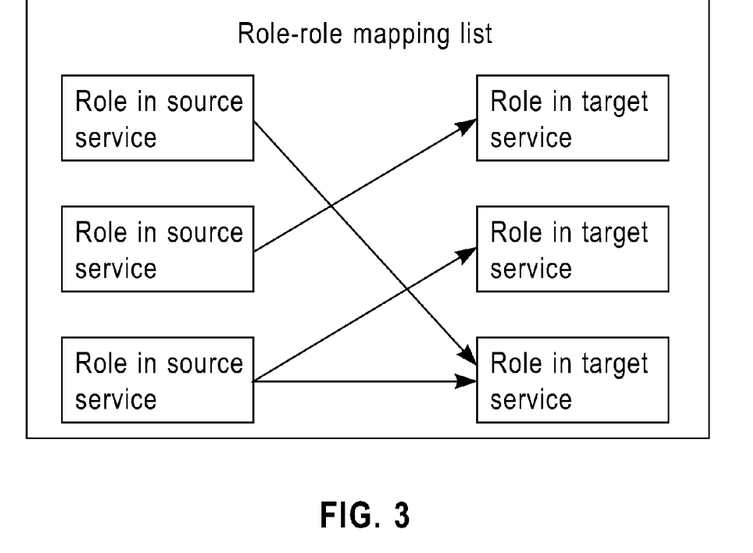
FIG. 3 depicts mapping relationships between roles of a user in source services and roles of the user in destination services.

As shown in FIG. 3, the role-role mapping list describes mapping relationships between roles of a user in source services and roles of the user in destination services. If a user has a role in a source service, he will have a corresponding mapped role in a destination service.

Figure 4:
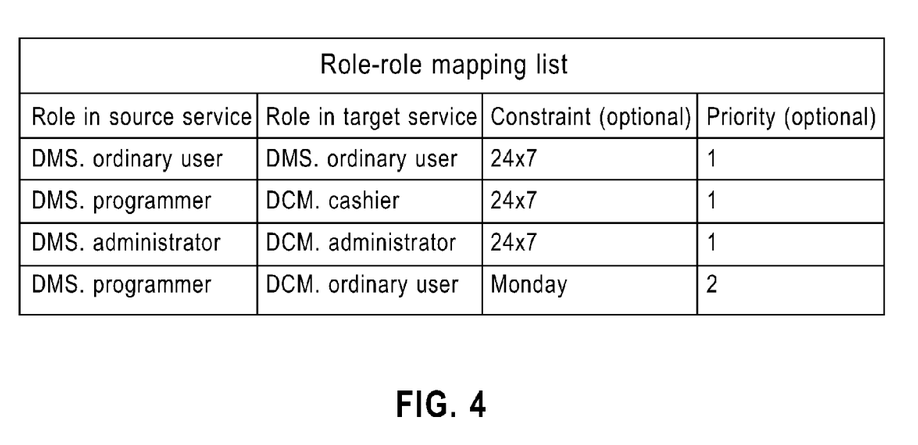
FIG. 4 shows a role-role mapping list according to an embodiment of the invention.

FIG. 4 shows an example of a role-role mapping list according to an embodiment of the invention. As shown in the table of FIG. 4, according to a first record in the table, if a user has the role of ordinary user in a source service, Digital Currency based Motivation Service, DMS, correspondingly he has the role of ordinary user in a destination service, Digital Currency Manager, DCM. Similarly, according to the second record in the table, if the user has the role of programmer in the source service DMS, correspondingly he has the role of cashier in the destination service DCM. Likewise, the third and fourth records also describe similar mapping relationships.

Additionally, it can be seen that the table of FIG. 4 also has a constraint field and a priority field, which provide further descriptions for the mapping relationships between the roles. For example, it can be observed from the second and fourth records that the user has roles of both cashier and ordinary user in the destination service DCM when he has the role of programmer in the source service DMS. In this manner, it can be seen which role the DMS Programmer should be mapped to according to the constraint and the priority.

Specifically, because the fourth record has a higher priority of 2, the programmer in the DMS is preferentially mapped to the ordinary user in the DCM when a limiting condition of "Monday" is satisfied, whereas the programmer in the DMS will be mapped to the cashier in the DCM according to a lower priority of 1 when the limiting condition is not satisfied. In the table, the notation 24×7 means all 24 hours of all 7 days of the week. The constraint and priority fields are not necessary for the role-role mapping list, but are only used to provide more descriptions of the role mapping. On the other hand, the descriptions of the role mapping are not limited to constraints and priorities. The mapping relationships can also be described in other terms according to the specific needs of individual applications.

Figure 8:
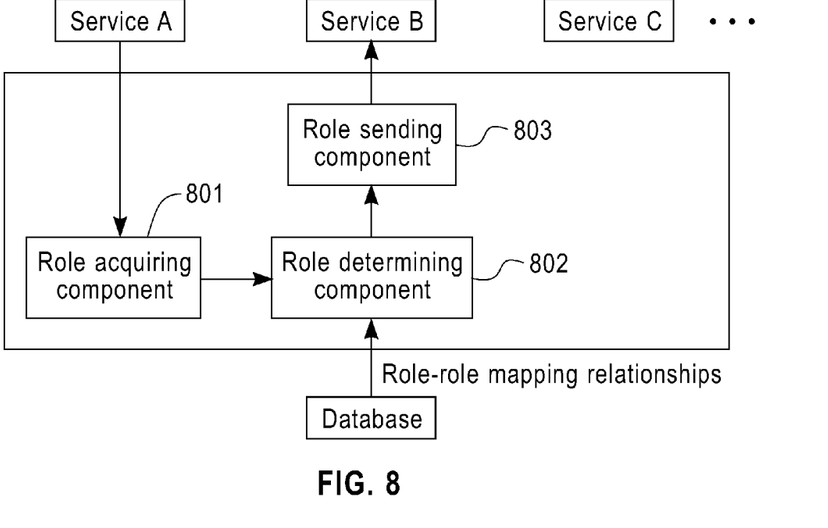
FIG. 8 shows a structural block diagram of a unified access control system according to an embodiment of the invention.

FIG. 8 shows a structural block diagram of a unified access control system to which the above role-role mapping relationships are applied according to an embodiment of the invention. As shown in FIG. 8, the unified access control system includes: a role acquiring component 801 for acquiring a role of a user in a composed service A; a role determining component 802 which determines a role of the user in a composed service B according to predefined role-role mapping relationships, in response to an invoking request to the composed service B from the composed service A during the execution process, where the role-role mapping relationships describe mapping relations between roles respectively contained in a plurality of composed services; and a role sending component 803 for sending the determined role in the composed service B to the composed service B.

Figure 5:
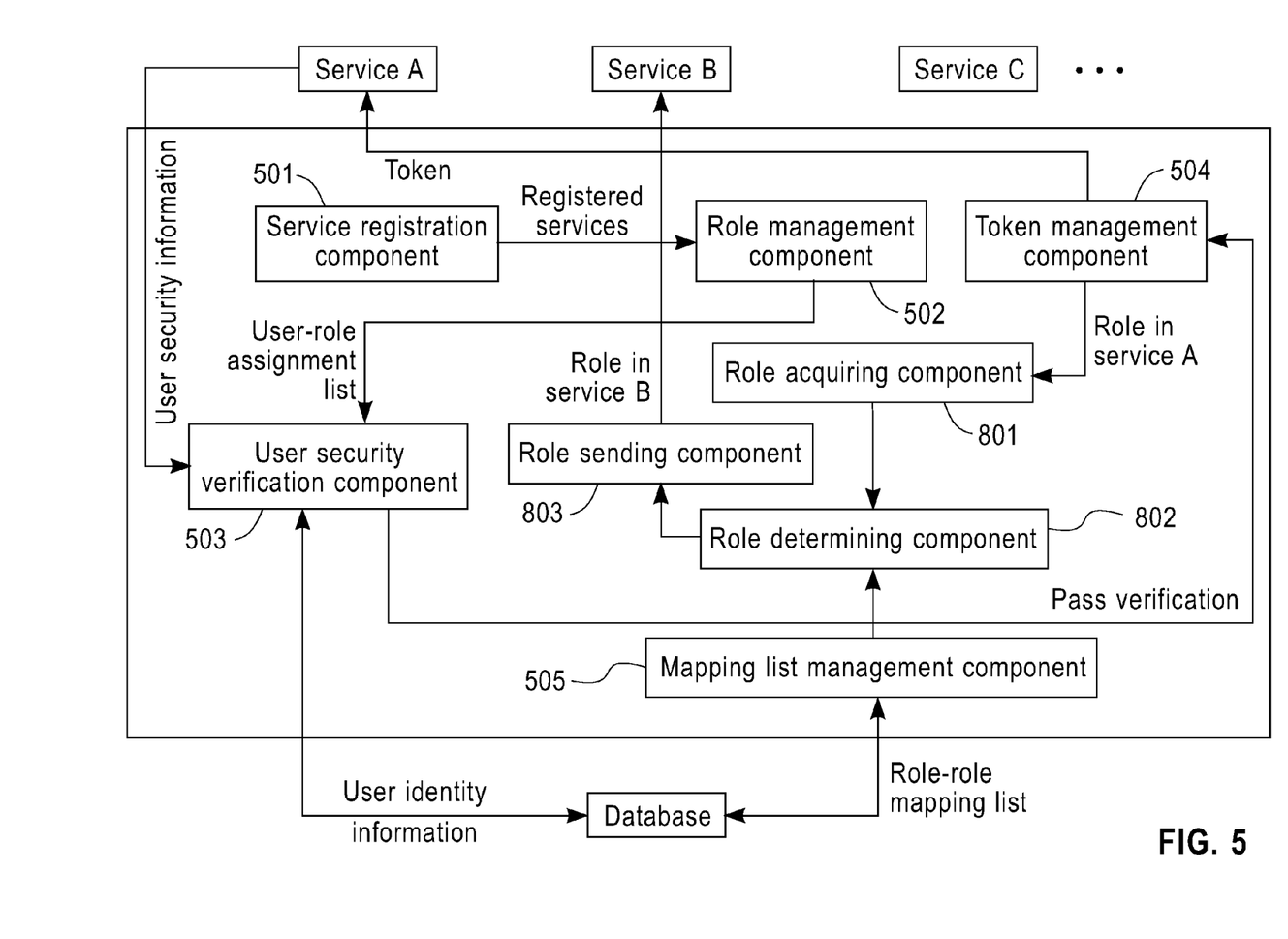
FIG. 5 shows a structural block diagram of a system for performing a unified access control on a plurality of composed services according to a preferred embodiment of the invention.

Above, the unified access control system according to the embodiment of the invention has been described, and various modifications and variations of it can be made by those skilled in the art without departing from the spirit and substance of the invention. For example, in order to obtain better information security, the system can further include a token management component for generating and managing a token to use the token as a credential for verification and authorization. FIG. 5 shows an exemplary preferred implementation of the unified access control system. The preferred implementation will be described in detail below in connection with FIG. 5.

As shown in FIG. 5, the unified access control system according to the invention can further include: a service registration component 501, a role management component 502, a security verification component 503, a token management component 504, and a mapping list management component 505. The service registration component 501 registers composed services using the present system as their security solutions to provide a unified security access control for the registered services. In one exemplary implementation, the service registration component records the registered services and their corresponding administrators.

The role management component 502 manages roles of services, and assigns a role to a user or cancels a role which has been assigned to a user. The administrator of each of the registered services defines all roles used in his service through the role management component, and assigns special roles having higher rights, such as system administrator, VIP, and the like, to corresponding users. Subsequently, the role management component 502 establishes a user-role assignment list according to settings of the administrators of the registered services so as to record corresponding relationships between the special roles and the users. For a user without a special role who requests access to a registered composed service for the first time, the role management component 502 automatically assigns a role of ordinary user having lower rights to the user, and records the role in the user-role assignment list. Although the role management component 502 is described here to be included in the unified access control system, this is only an exemplary structure. In fact, the component can also be included in the registered composed services, and the needed user and role information are provided from the composed services to the unified access control system.

The security verification component 503 is used to verify an identity and a role of the user in the requested composed service. When, for example, the service A receives an access request for the user, it transmits security information, such as a user ID, a login password, a role, and the like, which is inputted when the user logs in to the security verification component 503. The security verification component 503 verifies the user based on user identity information pre-stored in a database and the created user-role assignment list. If the received user ID, login password and role are consistent with the pre-stored user identity information and a record in the user-role assignment list, it is determined that the user passes the identification and the authentication. Here, the security verification component 503 is included in the unified access control system. However, it can be understood that the security verification component 503 can be included in the respective composed services, where results of the verification are provided from the composed services to the unified access control system, i.e., the identification is performed in the respective composed services.

The mapping list management component 505 is used to create and manage the role-role mapping list which records the role-role mapping relationships. The role-role mapping relationships can be preset by administrators of the respective composed services. Additionally, although as is described here the mapping relationships are recorded by the list created by the mapping list management component 505, it can be understood that the mapping relationships can be recorded in other ways, such as in a tree structure or in a text.

As described above, the function operation in the service A, when executed, needs to invoke an operation in another composed service B. In response to this invoking request, the role determining component 802 queries the role-role mapping list according to the role of the user in the service A which is acquired by the role acquiring component 801 so as to determine a corresponding role in the service B. The role sending component 803 notifies the service B of the determined role in the service B. Service B judges whether the role can perform the operation invoked by the service A by querying the access control list it maintains, and permits the service A to invoke the requested operation when the result of the judgment is "Yes".

In addition, in the present preferred embodiment, a token is used as a credential for the verification and authorization so as to guarantee the security of information transfer. When a user passes the identification and the authentication, the token management component 504 generates a token containing role information of the user in the requested composed service, e.g., the service A, for the user, sends the token to the service A, and saves a copy of the token in the system at the same time. The service A determines whether the user can perform the requested function operation according to the role information contained in the received token.

According to an example of the invention, the token can contain a token ID, a user UD, a login password, and the role information of the user in the requested composed service. When the function operation in the service A invokes an operation in another composed service B during the executing process, the service A sends the invoking request to the service B together with the received token ID; and the service B transmits the token ID to the token management component 504. After receiving the token ID, the token management component 504 finds a token matching the token ID from saved token copies, reads the role of the user in the service A from it, and notifies the role acquiring component of the role.

Although the token management component 504 is described above to save the copy of the token in the system after generating the token, and find a matched token from the saved token copies and read the role information from it after the token ID is received from the service B, this is an example. In other words, this is an implementation manner according to an exemplary management policy made for token management. In fact, other management policies can be adopted with respect to the generation and management of the token. For example, a policy can be put in place such that the token management component sends only the token to the service A after generating the token without saving any copy, and the service A transmits the token to the service B directly when requesting to invoke the service B. Thereby, the token management component can obtain the token from the service B and read the role information from it.

Other token management policies can be set for token management. For example, status information is set for tokens. That is, when a token is generated for a user who passes the security verification, the status of the token is set to be active, whereas when the user logs off or time expires, the state of the token is set to be inactive. It is then prescribed that the token is unavailable when the status of the token is inactive; and it is prescribed that when a user logs into a service and acquires a token, no new token is generated when he logs in or invokes other services. In summary, various token management policies can be set flexibly according to the requirements of applications.

Additionally, as described above, the plurality of composed services managed by the unified access control system according to the invention can be owned by different organizations and enterprises. Thus, the identity information of users accessing an application composed of the plurality of composed services is often stored in databases of different organizations and enterprises. Therefore, in order to improve the efficiency of the identification, the unified access control system according to the embodiment of the invention, can optionally further include a user management component, not shown, for recording data sources of users who have logged in any of the registered services so as to show in which of the databases the identity information of the users is stored. By employing the user management component, when a user who has accessed a composed service requests to access it again, the security verification component can directly query a corresponding database based on the recorded user data sources to verify the identity of the user, without the need of traversing each possible database, thereby improving the speed and efficiency of the identification.

Furthermore, the unified access control system according to the embodiment of the invention can further include a user group management component, not shown, for providing a function of defining user groups for the convenience of application users or for particular business needs. The user group management component supports static user group definition and dynamic user group definition. The dynamic user group does not designate a username of the group, but only defines query conditions for forming the group. By means of this component, the unified access control system of the invention is rendered to be more user-friendly and to be capable of meeting requirements of users and enterprises better.

Figure 9:
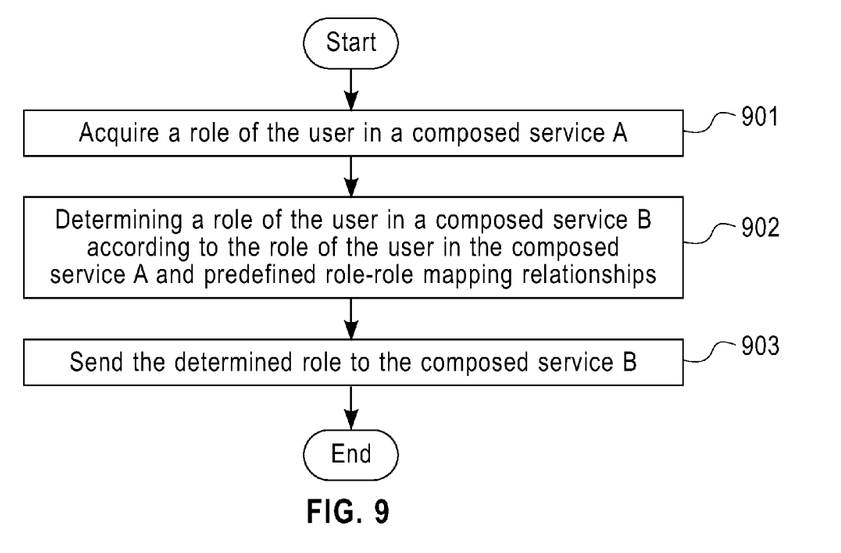
FIG. 9 shows a flow chart of a unified access control method according to an embodiment of the invention.

FIG. 9 shows a flow chart of a unified access control method applying role-role mapping relationships according to an embodiment of the invention. As shown in FIG. 9, a role of a user in a composed service A is acquired in step 901. In step 902, a role of the user in a composed service B is determined according to the role of the user in the composed service A and predefined role-role mapping relationships in response to a invoking request of the composed service A to the composed service B during the execution process. The role-role mapping relationships describe mapping relationships among roles respectively included in a plurality of composed services.

Figure 6:
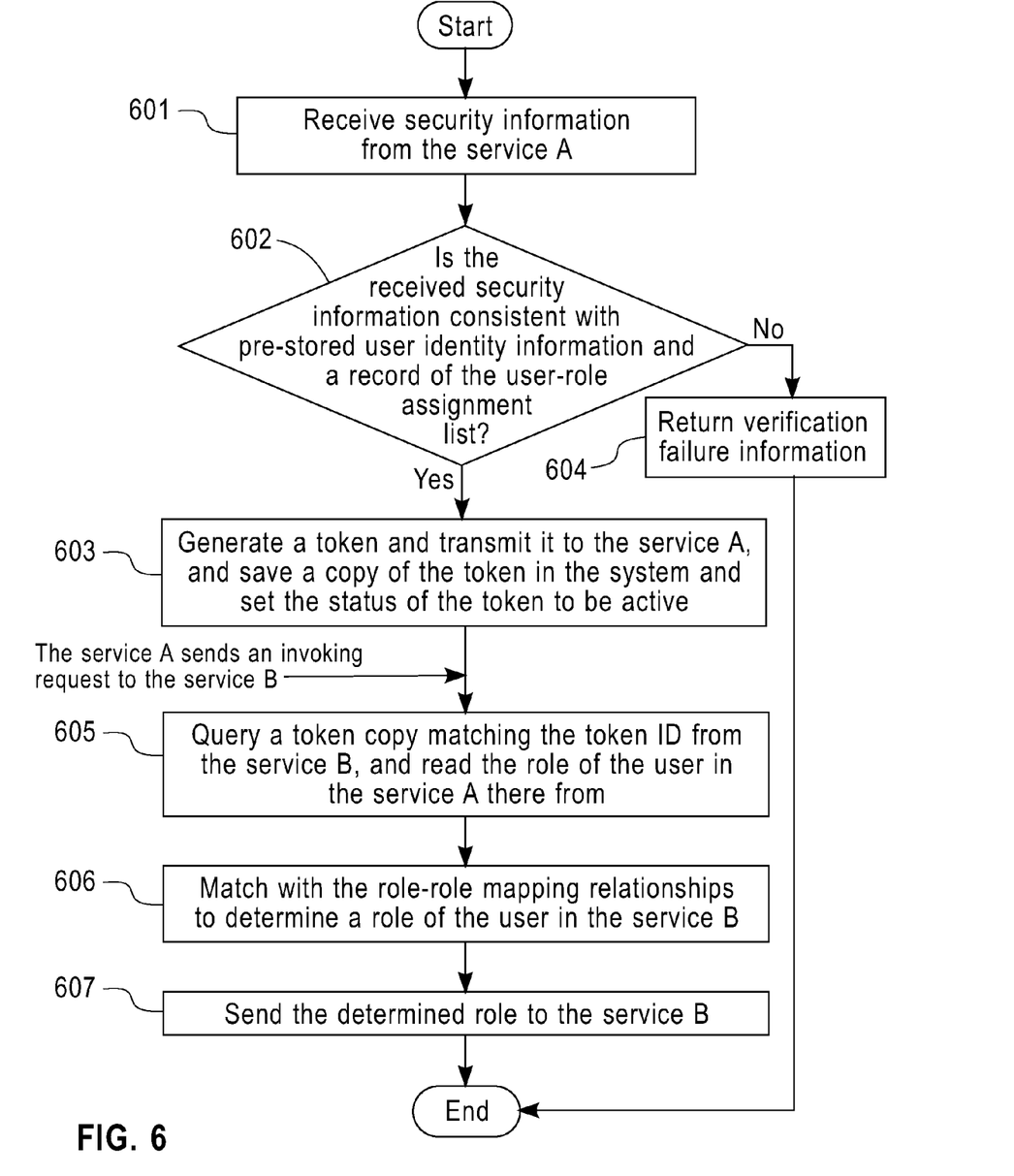
FIG. 6 depicts a flow chart of a method for performing a unified access control on a plurality of composed services according to a preferred embodiment of the invention.

Subsequently, the determined role in the composed service B is sent to the composed service B in step 903. The unified access control method according to the embodiment of the invention has been described above, and various modifications and variations can be made to it by those skilled in the art without departing from the spirit and substance of the invention. For example, it is preferable to generate a token as a credential for the verification and the authorization to obtain better information security. FIG. 6 shows a flow chart for an exemplary preferable implementation of the unified access control method. The preferable implementation will be described below in conjunction with FIG. 6.

In the flow chart shown in FIG. 6, a token is employed as a credential for verification and authorization, and a token management policy is set as follows: when a token is generated for a user who has successively logged into a service, a copy of the token is saved, and the status of the token is set to be active. When the user logs off or time expires, the state of the token is inactive; the token is unavailable when the status of the token is inactive; and when the user successfully logs into the service again, a new copy of the token substitutes for the old copy of the token and its status is set to be active again. It is understood that the above policy is an example given for the convenience of describing the method according to the embodiment of the invention, and system users can set different token management policies according to their specific needs.

As shown in FIG. 6, security information, such as a user ID, a password, and a role, which is inputted when the user requests to access a function of the composed service A, is received from the composed service A. Subsequently, in step 602, the security verification component verifies the user based on user identity information pre-stored in a database and the created user-role assignment list to determine whether the received user ID, password, and role are consistent with the pre-stored user identity information and records in the user-role assignment list. When the information is consistent, the verification is successful, and the flow proceeds to step 603; when the information is not consistent, verification failure information is returned to the service A in step 604, and then the processing flow ends. It is seen that it is not that steps 601 and 602 can only be performed in the unified access method of the invention. Instead, they can be performed in the composed service A.

In step 603, the token management component generates a token, sends the token to the service A, saves a copy of the token in the system, and sets the state of the token to be active. Information, such as a token ID, a user ID, a login password, and a role of the user in the requested composed service, can be contained in the token. After receiving the token, the service A determines whether the user can perform the requested function operation according to the access control list which it saves.

As described above, the function operation in the service A, when executed, needs to invoke a certain operation in another composed service B. Therefore, when the service A sends the invoking request and the token ID to the service B, and the token management component receives the token ID forwarded by the service B in response to the invoking request, the token management component queries a saved token copy corresponding to the received token ID in step 605, and reads the role of the user in the service A. In step 606, the role determining component 802 matches the read role of the user in the service A with the predefined role-role mapping relationships to determine a role of the user in the service B.

In step 607, the role sending component sends the determined role to the service B, and then the processing flow ends. On the other hand, after receiving the determined role, the service B judges whether the user has a right to perform the operation in the service B according to the access control list which it saves. When the user has the right, the service A is permitted to invoke the operation; otherwise, invoking failure information is returned to the service A.

Figure 7:
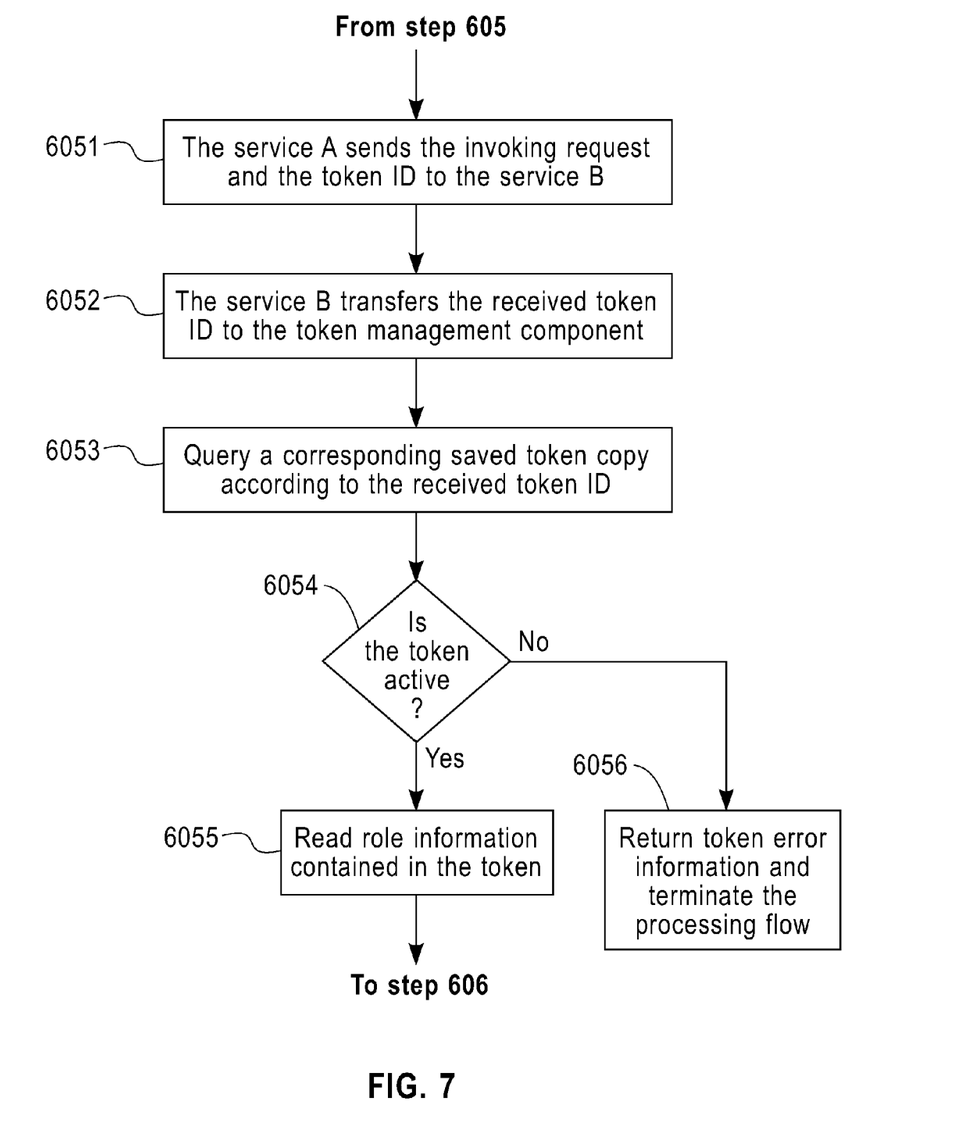
FIG. 7 is a flow chart depicting steps in the method shown in FIG. 6 in more detail.

Below, the step 605 in the above unified access control method will be described in more detail in conjunction with FIG. 7. As shown in FIG. 7, when the function operation in the service A, when executed, needs to invoke the operation in another composed service B, the service A sends the invoking request and the token ID in the received token to the service B in step 6051. In step 6052, the service B receives the invoking request and the token ID, and transfers the token ID to the token management component. In step 6053, the token management component queries, according to the received token ID, a corresponding saved token copy. Subsequently, the token management component checks the status of the token to determine whether it is active in step 6054. When the status of the token is active, the token management component reads role information included in the token in step 6055; otherwise, token error information is returned to the service B in step 6066, and the processing flow ends.

The exemplary unified access control method according to the preferred embodiment of the invention has been described in conjunction with FIGS. 6 and 7. When specifically implemented, the method of the invention can follow an AXIS2 architecture, and use, for example, a SOAP protocol, Simple Object Access Protocol, and Handler technology to realize transfer of tokens.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of providing a unified access control for a plurality of composed services in a distributed computing environment, the method comprising:

acquiring a first role of a user in a first composed service;

sending an invoking request by a processing unit of the first composed service to a second composed service;

receiving the first role of the user in the first composed service and predefined role-role mapping relationships based on the invoking request;

determining a second role of the user in the second composed service according to the first role of the user in the first composed service and the predefined role-role mapping relationships, wherein the second role is further determined based on         determining that is plurality of the predefined role-role mapping relationships are associated with the first role, wherein each of the plurality of the predefined role-role mapping relationships maps the first role of the user in the first composed service to at least two different roles of the user in the second composed service:

selecting one of the plurality of the predefined role-role mapping relationships based on             a current temporal condition satisfying a temporal constraint associated with the one of the plurality of the predefined role-role mapping relationships, and             a priority ranking associated with the one of the plurality of the predefined role-role mapping relationships being higher than a priority ranking associated with a remaining set of the plurality of the predefined role-role mapping relationships;

determining the second role from the one of the plurality of the predefined role-role mapping relationships that has been selected; and sending the determined second role in the second composed service to the second composed service.

2. The method of claim 1, further comprising verifying an identity and the first role of the user in the first composed service based on an access request of the user to the first composed service.

3. The method of claim 2, wherein the verifying further comprises:

checking the identity and the first role of the user based on user identity information and user role assignment information respectively, wherein the user identity information comprises a user identifier and a corresponding login password, and the user role assignment information comprises the user identifier and a corresponding role.

4. The method of claim 2, further comprising:

generating a token comprising role information of the user in the first composed service based on the user passing the identity and role verification;

transferring the token to the first composed service;

saving a copy of the generated token; and setting a status of the token to be active.

5. The method of claim 4, wherein the token further comprises a token identifier, a user identifier associated with the user, and a login password associated with the user.

6. The method of claim 5, wherein the determining further comprises receiving the token identifier;

querying the saved token copy corresponding to the token identifier, wherein the token identifier is sent to the second composed service when the first composed service requests to invoke the second composed service;

checking the status of the token according to the saved token copy that has been queried;

reading the first role information from the saved token copy if the status of the token is active; and determining the second role of the user in the second composed service by matching the read role information and the role-role mapping relationships.

7. The method of claim 4, further comprising:

setting the status of the token to be inactive based on the user logging off the first composed service or time expiring.

8. The method of claim 7, further comprising:

confirming that the user has a right for the access and generating a new token based on a request from the user to access the first composed service again;

updating the saved copy of the token by using a copy of the new token; and re-setting a token status of the new token to be active.

9. A unified access control computer device system for providing a unified access control for a plurality of composed services in a distributed computing environment, the system comprising:

a role acquiring component configured to acquire a first role of a user in a first composed service;

a processing unit of the first composed service configured to send an invoking request to a second composed service;

a role determining component configured to determine a second role of the user in a second composed service according to the first role of the user in the first composed service and predefined role-role mapping relationships, based on the invoking request, wherein the role determining component is further configured to determine the second role based on determining that a plurality of the predefined role-role mapping relationships is associated with the first role, wherein each of the plurality of the predefined role-role mapping relationships maps the first role of the user in the first composed service to at least two different roles of the user in the second composed service;

selecting one of the plurality of the predefined role-role mapping relationships based on a current temporal condition satisfying a temporal constraint associated with the one of the plurality of the predefined role-role mapping relationships, and a priority ranking associated with the plurality of the predefined role-role mapping relationships being higher than a priority ranking associated with each of a remaining set of the plurality of the predefined role-role mapping relationships;

determining the second role from the one of the plurality of the predefined role-role mapping relationships that has been selected; and a role sending component configured to send the determined second role in the second composed service to the second composed service.

10. The system of claim 9, further comprising:

a service registration component configured to register the composed services that use the system to perform security verification;

a role management component configured to manage the roles in the registered composed services; and a mapping list management component configured to create and manage a mapping list recording the role-role mapping relationships.

11. The system of claim 10, further comprising:

a security verification component configured to verify an identity and the first role of the user in the first composed service based on an access request of the user to the first composed service.

12. The system of claim 11, wherein the security verification component is further configured to check the identity and the first role of the user based on user identity information and user role assignment information, wherein the user identity information comprises a user identifier and a login password, and wherein the user role assignment information comprises the user identifier and the user role assignment information.

13. The system of claim 10, wherein the role management component is further configured to assign special roles having higher priorities other than a priority of an ordinary user role to users in advance, and assign an ordinary user role to a user without a special role when the user requests to access the service for a first time.

14. The system of claim 11, further comprising:

a token management component configured to generate a token comprising the first role of the user in the first composed service based on the identity and the first role of the user being verified, transfer the token to the first composed service, and save a copy of the generated token and setting a status of the token to be active.

15. The system of claim 14, wherein the token further comprises a token identifier, a user identifier associated with the user, and a login password associated with the user.

16. The system of claim 15, wherein the token management component is further configured to
- receive the token identifier sent by the second composed service,
- query a saved token copy corresponding to the token identifier, and
- read the role information from the token copy, wherein the token identifier is sent to the second composed service when the first composed service requests to invoke the second composed service.

17. The system of claim 16, wherein the role determining component is further configured to query the mapping list according to the role information read by the token management component to determine the second role of the user in the second composed service.

18. The system of claim 10, further comprising:
- a user management component configured to record data resources of the user to indicate which database the user is from when the user requests to access any of the composed services registered in the service registration component.

19. The system of claim 18, further comprising:
- a user group management component configured to establish a static user group or dynamic user group definition according to a request from the user to access any of the composed services registered in the service registration component.

20. A computer program product for providing a unified access control for a plurality of composed services in a distributed computing environment, the computer program product comprising:
- a non-transitory storage medium readable by a processing circuit and storing instructions for execution by the processing circuit for performing a method comprising:
  - acquiring a first role of a user in a first composed service;
  - sending an invoking request by a processing unit of the first composed service to a second composed service;
  - receiving the first role of the user in the first composed service and predefined role-role mapping relationships based on the invoking request;
  - determining a second role of the user in the second composed service according to the first role of the user in the first composed service and the predefined role-role mapping relationships, wherein the second role is further determined based on
    - determining that is plurality of the predefined role-role mapping relationships are associated with the first role, wherein each of the plurality of the predefined role-role mapping relationships maps the first role of the user in the first composed service to at least two different roles of the user in the second composed service;
    - selecting one of the plurality of the predefined role-role mapping relationships based on
      - a current temporal condition satisfying a temporal constraint associated with the one of the plurality of the predefined role-role mapping relationships, and
      - a priority ranking associated with the one of the plurality of the predefined role-role mapping relationships being higher than a priority ranking associated with a remaining set of the plurality of the predefined role-role mapping relationships;
    - determining the second role from the one of the plurality of the predefined role-role mapping relationships that has been selected; and
  - sending the determined second role in the second composed service to the second composed service.

* * * * *